Patented Aug. 16, 1949

2,479,018

UNITED STATES PATENT OFFICE 2,479,018

BUTADIENE 1,3-ACRYLONITRILE RUBBERY COPOLYMERS WITH IMPROVED LOW-TEMPERATURE FLEXIBILITY

Leonard Nicholl, Nyack, and George Kesslin, New York, N. Y., assignors to Kay-Fries Chemicals, Inc., West Haverstraw, N. Y., a corporation of New York No Drawing. Application June 5, 1946,
Serial No. 674,654

3 Claims. (Cl. 260—31.8)

This invention relates to butadiene 1,3-acrylonitrile rubbery copolymers, and, more particularly, to such rubbery copolymers incorporating di-p-isobutyl sebacate as a plasticizer. This application is a continuation-in-part of our application Ser. No. 512,638, filed December 2, 1943, for Di-p-isobutyl sebacate, now Patent No. 2,403,804, issued July 9, 1946.

Hitherto, the cellulose esters, vinyl resins, rubber hydrochloride derivatives, and other thermoplastic and thermosetting resins have been plasticized by a wide variety of compounds, including various esters of polybasic carboxylic acids, such as the phthalates, sebacates, adipates, etc. However, compounds which have been found to be useful as plasticizers for such thermoplastic and thermosetting resins, are found to be wholly unusable with elastomers of the butadiene 1,3-acrylonitrile rubbery copolymer type.

Conversely, plasticizers which are compatible with butadiene 1,3-acrylonitrile rubbery copolymers, are incompatible with cellulosic esters, etc., in spite of the very close family relationships existing between the groups of plasticizers. So much so, that in this field, analogical reasoning leads only to confusion, and it is not possible to predict what the effect of any given compound, as a plasticizer, will be on a plastic composition, until it has been tried out under commercial operating conditions.

In the present day accelerated development of synthetic rubber plastic compounds, or, more properly speaking, rubbery copolymers, there has been a crying need for plasticizers which will impart to the rubbery copolymers a desired low temperature flexibility. In the use of synthetic rubbers for equipment in polar regions under subarctic conditions, as well as for industrial uses in refrigeration and low temperature work generally, it has been found that synthetic rubbers are not plasticized or flexibilized properly, to stand under low temperature working conditions. This is particularly true with the general run of plasticizers used for rubber and rubber substitutes. In the development of the newer synthetic rubbers, including those of the butadiene 1,3-acrylonitrile types, frangibility at low temperatures is very marked. This condition has been overcome by incorporating therewith a suitable plasticizer, such a di-p-isobutyl sebacate recently prepared and discovered by us. This compound may be incorporated in varying amounts in rubbery copolymers of the butadiene 1,3-acrylonitrile type, although in amounts varying from 10 to 25% of the rubbery copolymer it has been found to give excellent results, particularly the much desired "low temperature flexibility" now so highly sought after.

The results of the incorporation of diisobutyl sebacate as a plasticizer in butadiene 1,3-acrylonitrile rubbery copolymers are shown in the following test report wherein comparison is made of the plasticizing effects of equivalent mixtures of the above copolymers with plasticizers comprising triethylene glycol diheptoate, tributoxy ethyl phosphate, and dibutyl phthalate. Tributoxy ethyl phosphate and dibutyl phthalate are well known plasticizers for butadiene 1,3-acrylonitrile copolymers, and are used as standards of comparison.

*Copy of tests run on sample di isobutyl sebacate in comparison with other plasticizers*

|  | DiIso Butyl Sebacate | | | Plasticizer "SC" | | | Tributoxy Ethyl Phosphate | | | DiButyl Phthalate | | |
|---|---|---|---|---|---|---|---|---|---|---|---|---|
| Min. Cure @ 310° F | 20 | 30 | 45 | 20 | 30 | 45 | 20 | 30 | 45 | 20 | 30 | 45 |
| Mod. @ 300% | 900 | 975 | 1,175 | 1,050 | 1,225 | 1,175 | 1,250 | 1,400 | 1,550 | 900 | 1,150 | 1,250 |
| Ult. Tensile | 1,800 | 1,950 | 1,710 | 2,310 | 2,275 | 2,410 | 2,200 | 2,350 | 2,350 | 2,125 | 2,350 | 2,100 |
| Ult. Elongation | 465 | 450 | 375 | 505 | 460 | 495 | 495 | 455 | 425 | 505 | 515 | 415 |
| Tens. Sheet Hardness | 40 | 42 | 43 | 45 | 47 | 47 | 45 | 46 | 46 | 45 | 45 | 47 |
| Flexible to °F | —86 | | | —86 | | | —86 | | | —86 | | |
| Brittle at °F | —104 | | | —94 | | | —104 | | | —94 | | |
| 100% Flex. (286 F. P. M.) Pin Method | 5,500 | | | 2,900 | | | 5,966 | | | 6,266 | | |
| Sp. Gr | 1.17 | | | 1.18 | | | 1.20 | | | 1.20 | | |
| ½" Disc Cured @ 310° F | 45 | | 60 | 45 | | 60 | 45 | | 60 | 45 | | 60 |
| Shore Hardness | 42 | | 43 | 45 | | 46 | 47 | | 47 | 48 | | 48 |
| Per Cent Lupke Rebound | 75 | | 76 | 75 | | 75 | 75 | | 72 | 75 | | 73 |
| Per Cent Comp. Set ASTM | 17 | | 13 | 15 | | 12 | 21 | | 15 | 12 | | 11 |

*Copy of tests run on sample di isobutyl sebacate in comparison with other plasticizers—Continued*

|  | Di Iso Butyl Sebacate | Plasticizer "SC" | Tributoxy Ethyl Phosphate | Di Butyl Phthalate |
|---|---|---|---|---|
| Per Cent Volume Change, ASTM-SAE Oil, Aniline Pt. 159° F., 70 hrs. at 212° F | −4 | −.863 | +3 | +2.16 |
| Per Cent Volume Change, Ethylene Glycol, 70 hrs. at 212° F | +3 | +2.06 | +9 | +1.59 |
| Per Cent Volume Change, 20% Aromatic Gas, 70 hrs. at Room Temp | +1.59 | +4 | +9 | +6 |
| Flexible to °F. After ASTM-SAE Oil, Aniline Pt. 159° F., 70 hrs. at 212° F | −32 | −22 | −22 | −22 |
| Flexible to °F. After Paraffin Lub. Oil, Aniline Pt. 240° F., 70 hrs. at 212° F | −32 | −22 | −22 | −22 |
| Flexible to °F. After Ethylene Glycol, 70 hrs. at 212° F | −68 | −50 | −40 | −40 |
| Flexible to °F. After Distilled Water, 70 hrs. at 212° F | −68 | −68 | −58 | −58 |
| Flexible to °F. After 100 Octane Gas, 70 hrs. at Room Temp | −58 | −58 | −50 | −58 |
| Flexible to °F. After 20% Aromatic Gas, 70 hrs. at Room Temp | −94 | −94 | −94 | −94 |
| Brittle at °F. After ASTM-SAE Oil, Aniline Pt. 159° F., 70 hrs. at 212° F | −76 | −76 | −76 | −76 |
| Brittle at °F. After Paraffin Lub. Oil, Aniline Pt. 240° F., 70 hrs. at 212° F | −76 | −86 | −86 | −86 |
| Brittle at °F. After Ethylene Glycol, 70 hrs. at 212° F | Below −104 | Below −104 | Below −104 | −104 |
| Brittle at °F. After Distilled Water, 70 hrs. at 212° F | −104 | −104 | −104 | −94 |
| Brittle at °F. After 100 Octane Gas, 70 hrs. at Room Temp | Below −104 | Below −104 | Below −104 | Below −104 |
| Brittle at °F. After 20% Aromatic Gas, 70 hrs. at Room Temp | Below −104 | −104 | Below −104 | Below −104 |
| 180° Bend, Air Oven Aged, 48 hrs. at 300° F | OK | OK | OK | OK |
| 180° Bend, Air Oven Aged, 70 hrs. at 212° F | OK | OK | OK | OK |
| Heat Loss, Air Oven Aged, 48 hrs. at 300° F | −17 | −10 | −10 | −16 |
| Heat Loss, Air Oven Aged, 70 hrs. at 212° F | −12 | −3 | −3 | −1.21 |
|  | Air Oven Aged 70 hrs. at 212° F. | Air Oven Aged 70 hrs. at 212° F. | Air Oven Aged 70 hrs. at 212° F. | Air Oven Aged 70 hrs. at 212° F. |
| Ultimate Tensile | 2,890 | 1,700 | 2,025 | 2,900 |
| Ultimate Elongation | 205 | 225 | 280 | 235 |
| Shore Hardness | 70 | 57 | 50 | 67 |

A typical distillation run is as follows:

[Total weight of batch—805 lbs.]

| Fract. | Liq. T. | Vap. T. | Press. | Weight Fract. | Ester No. | Acidity as Sebacic Acid | Remarks |
|---|---|---|---|---|---|---|---|
|  | Degrees | Degrees | Mm. | Pounds | Per cent | Per cent |  |
| 1 | 78–145 | 65–50 | 140–2 | 132 | .2 |  | Practically pure isobutyl alcohol. |
| 2 | 154 | 154 | 2 | 41 | 98.8 | .081 | Good product. |
| 3 | 154 | 154 | 2 | 575 | 99.2 | .081 | Do. |
| 4 |  |  |  | 51 |  |  | Residue. |

The reaction described above can be graphically illustrated by the following equation:

(1)

$$\underset{\substack{\text{(Sebacic}\\\text{acid)}}}{\overset{\text{COOH}}{\underset{\text{COOH}}{(\text{CH}_2)_8}}} + \underset{\substack{\text{(Primary isobutyl}\\\text{alcohol)}}}{2\text{CH}_3\overset{\text{CH}_3}{\underset{}{\text{CH}}}-\text{CH}_2\text{OH}} \xrightarrow{\text{H}_2\text{SO}_4} \underset{\substack{\text{(Di-primary isobutyl}\\\text{sebacate)}}}{\overset{\text{COO}\cdot\text{CH}_2\overset{\text{CH}_3}{\underset{}{\text{CH}}}\cdot\text{CH}_3}{\underset{\text{COO}\cdot\text{CH}_2\overset{}{\underset{\text{CH}_3}{\text{CH}}}-\text{CH}_3}{(\text{CH}_2)_8}}} + 2\text{H}_2\text{O}$$

The novel compound of the present invention may be prepared in the following manner: 670 lbs. of p-isobutyl alcohol are charged into a 150 gallon still. The liquid is raised to a temperature of approximately 80° C. and while stirring, 435 lbs. of 97.5% sebacic acid are added as rapidly as convenient, and usually in a one to two hour time period. To the mixture in the still there is added 3.8 lbs. of concentrated sulphuric acid as a catalyst, and the still is closed. The temperature of the reaction mixture is increased until the liquid temperature has risen to approximately 99° C. In a practical operation, at this temperature, a constant boiling mixture of p-isobutyl alcohol and water forms and begins to distill over. A sufficient quantity of the constant boiling mixture is distilled over to remove all the water. At this stage of the process the liquid temperature in the still will have reached 133° C. and the vapor temperature approximately 97° C. 100% esterification of the acid by the alcohol is indicated when a test sample on titration requires approximately .8 cc. of N/10 NaOH per 1 cc. of sample. The crude ester product is then treated with 7.8 lbs. of anhydrous sodium carbonate (100% excess for the indicated acidity). The crude product is then distilled without a dephlegmator and under a low vacuum of 140 mm. to remove residual primary isobutyl alcohol. Thereafter the di-p-isobutyl sebacate is distilled over, preferably under a high vacuum of 2 mm. to 4 mm. with corresponding variations in liquid temperature. Generally, the more the pressure used approaches atmospheric pressure, the higher the distillation temperature will have to be.

It will now be appreciated that there has been disclosed a novel compound di-p-isobutyl sebacate, compounded with an particularly suited as a plasticizer for elastomers comprising rubbery copolymers of the butadiene 1,3 acrylonitrile type, and particularly adapted to impart "low temperature flexibility" to them and other elastomers.

What is claimed is:

1. As a composition of matter, a butadiene 1,3-acrylonitrile rubbery copolymer, including 20–25% of di-p-isobutyl sebacate based on the weight of the copolymer.

2. As a composition of matter, a butadiene 1,3-acrylonitrile rubbery copolymer characterized by "low temperature" flexibility and including 20–25% of di-p-isobutyl sebacate based on the weight of the copolymer.

3. As a composition of matter, a butadiene 1,3-acrylonitrile rubbery copolymer, including 25% of di-p-isobutyl sebacate based on the weight of the copolymer.

LEONARD NICHOLL.
GEORGE KESSLIN.

REFERENCES CITED

The following references are of record in the file of this patent:

UNITED STATES PATENTS

| Number | Name | Date |
|---|---|---|
| 2,403,804 | Kesslin | July 9, 1946 |

OTHER REFERENCES

Hycar Synthetic Rubber-Softener Study, vol. 2, 1941.